Feb. 9, 1937.  C. A. SWANSTROM  2,070,032
MANUFACTURE OF ELASTIC STOP NUTS
Filed April 30, 1935   2 Sheets-Sheet 1
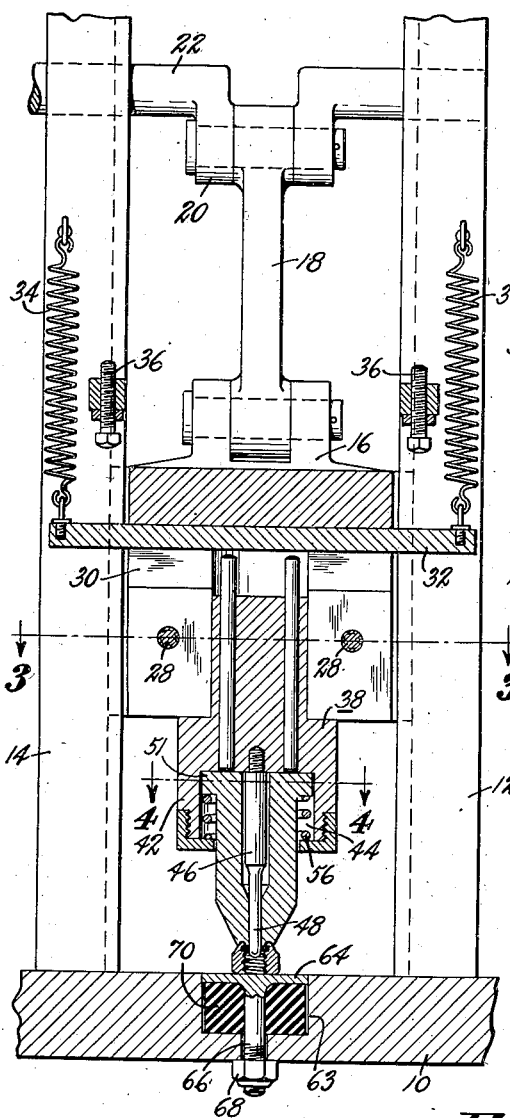
Fig.1.
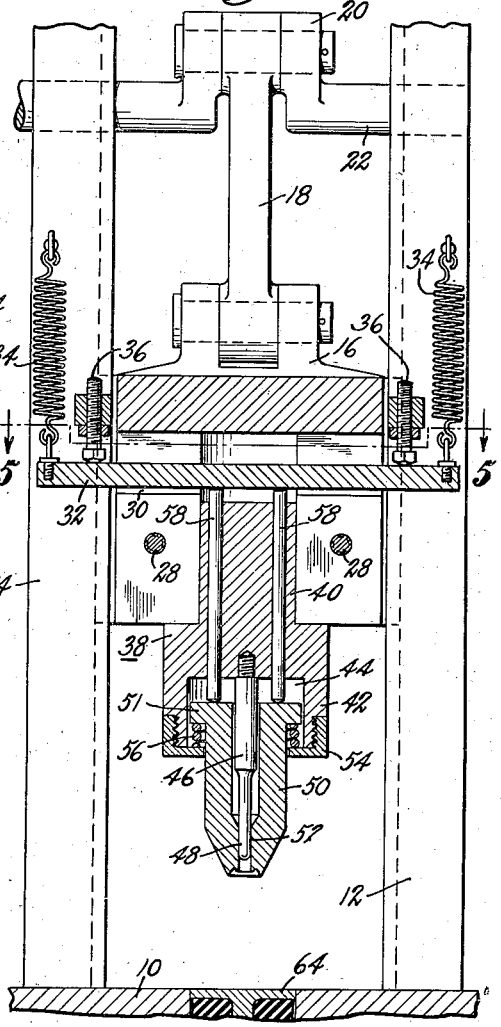
Fig.2.
Fig.8.
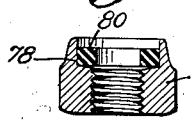
Fig.9.
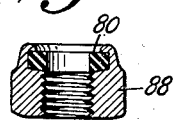
Fig.10
INVENTOR,
Carl A. Swanstrom
BY
ATTORNEY.

Feb. 9, 1937.  C. A. SWANSTROM  2,070,032
MANUFACTURE OF ELASTIC STOP NUTS
Filed April 30, 1935   2 Sheets-Sheet 2

INVENTOR,
Carl A. Swanstrom
BY
ATTORNEY

Patented Feb. 9, 1937

2,070,032

UNITED STATES PATENT OFFICE 2,070,032

MANUFACTURE OF ELASTIC STOP NUTS

Carl A. Swanstrom, Irvington, N. J., assignor to Elastic Stop Nut Corporation, Elizabeth, N. J., a corporation of New Jersey Application April 30, 1935, Serial No. 19,050

16 Claims. (Cl. 10—72)

The present invention relates to the manufacture of elastic stop nuts and has particular reference to the manufacture of nuts of the kind shown in U. S. Pat. No. 1,550,282, granted to Ture Gustaf Rennerfelt on the 18th day of August, 1925.

In nuts of this character, which are self-locking, a non-metallic washer, preferably of pressed fiber of known kind, is held within the nut adjacent to one end of the bore by crimping or otherwise deforming a part of the metal of the nut over the washer, which is seated in a suitable recess provided at one end of the bore of the nut.

In order for the non-metallic washer to satisfactorily perform its function, it is necessary that it be locked sufficiently tight in the structure of the nut so that there is no possibility of the washer turning, and further the diameter of the bore of the washer must be held within close limits if satisfactory action of the nut is to be obtained.

In nuts of the kind under consideration, the bore of the non-metallic washer is not threaded and the locking thread is formed in the washer by the thread of the bolt or stud on to which the nut is threaded. I have found that a most satisfactory action is obtained when the initial bore of the washer is of a diameter such that when the nut is threaded on to a bolt or stud of the proper size, the thread which is formed in the washer is from 60 to 80% of the full depth of the thread. If it is less than this, the holding action of the washer is impaired, and if it is greater than this there is likelihood of a part of the material of the washer being forced out of the nut because of the excessive displacement of the material resulting from the formation of a full depth thread.

As a general rule it may be said that the larger the diameter of the bore of the nut the smaller is the percentage of the full depth of the thread required to be formed in the washer to secure the desired holding action.

It is further essential to the production of a commercial product embodying the invention that the manufacture thereof be accurate and rapid as well as cheap. It is therefore the object of the present invention to provide a novel method and apparatus whereby nuts of the character under consideration may be manufactured rapidly and cheaply while at the same time insuring the provision in the finished product of a non-metallic washer which in all cases is locked with sufficient pressure to eliminate possibility of turning within the nut and which, further, is accurately dimensioned with respect to its internal bore. To this end I first form a threaded nut blank having a washer-receiving recess at one end of the bore of the nut and an annular flange portion surrounding the recess. A washer of suitable fibrous material which is advantageously punched from strip or sheet material in known manner is then inserted into the recess and the annular flange crimped inwardly over the top of the washer to lock the washer in place, in the following manner. A pilot having a diameter slightly larger than the final diameter desired in the finished product is passed through the bore of the washer before deforming or crimping pressure is applied to the metal of the flange, and while the pilot is still retained within the washer and maintaining its bore at oversize diameter, the material of the flange is crimped over the top of the washer to lock the washer in place. After the crimping operation is performed, the pilot is then withdrawn. Advantageously the bore in the washer blank is slightly less than the diameter of the pilot although this is not essential in all cases.

This series of steps, while capable of being performed by hand operations, is most advantageously carried out by means of a hand or power press, the latter being preferable from the standpoint of speed of production. When carried out by means of a press having a certain stroke, provision must be made to take care of variations in the depth of the nut blanks, since a variation of a few thousandths of an inch would be sufficient to cause a wide variation in the amount of locking pressure exerted on the washer.

In order to provide for uniform locking pressure in spite of such variation, and further in order to provide for the rapid and accurate manufacture of the nuts, I provide a novel form of tool suitable for use in a press of ordinary known construction, and further provide resilient means for supporting the nut during the pressing operation as will hereinafter be more fully described.

For a better understanding of the detailed nature of the invention and the manner in which it is carried into effect, I have shown in the accompanying drawings a preferred form of tool apparatus operating in accordance with the method of the invention, and I will now describe such apparatus.

In the drawings, Fig. 1 is a front elevation, partly in section, of a punch press fitted with tool apparatus embodying the invention;

Fig. 2 is a view similar to Fig. 1 showing the slide of the press in a different position;

Fig. 8 is a section showing a different form of bedplate from that shown in Fig. 1;

Fig. 9 is a section on an enlarged scale of a stop nut blank;

Fig. 10 is a similar section of the finished stop nut; and

Figure 3:
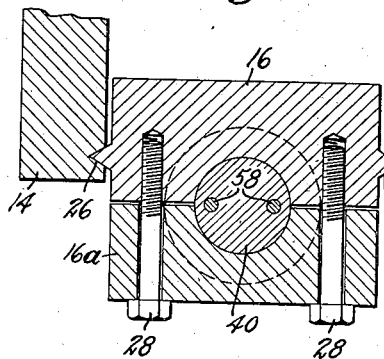
Fig. 3 is a section taken on the line 3—3 of Fig. 1.
Figure 5:
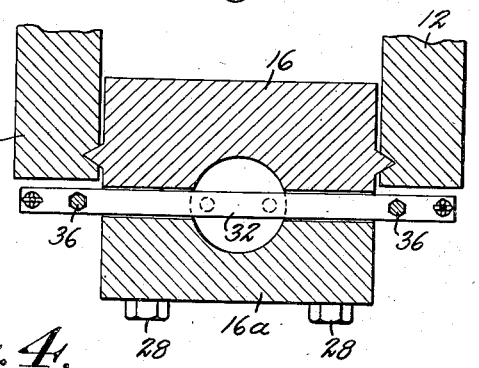
Fig. 5 is a section taken on the line 5—5 of Fig. 2.
Figure 4:
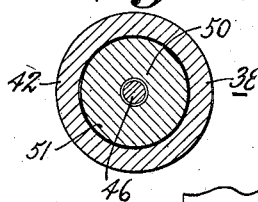
Fig. 4 is a section taken on the line 4—4 of Fig. 1.

Referring now more particularly to Figs. 1 to 5, the apparatus shown comprises an ordinary punch press having a press bed 10 and standards 12 and 14 carrying a slide 16 which is connected by means of a pitman 18 to the crank arm 20 of a crank 22 which may be operated either by hand or from a suitable source of power. As shown in Figs. 3 and 5, the slide 16 is guided in suitable grooves 24 and 26 in the standards of the press. Slide 16 is in two parts, having a removable cap 16a adapted to be secured to the main part of the slide by means of studs 28. The slide is further provided with a transverse slot 30 in which there is placed a knock-out bar 32, the bar being somewhat narrower than the slot and preferably being resiliently held against the upper edge of the slot by means of coil springs 34 attached to the standards. Adjustable studs 36 screwed into suitable bosses on the standards and held in adjusted position by suitable lock nuts are provided to force the knock-out bar away from the upper edge of the slot as the slide rises in the press on its return from a working stroke.

The apparatus thus far described is of known construction and per se forms no part of the present invention.

As shown in Figs. 3 and 5, the slide 16 and cap 16a are each provided with a semi-cylindrical recess which together form a cylindrical bore for clamping into the slide a tool comprising a holder indicated generally at 38 and having a shank 40 adapted to fit into the bore of the slide and an enlarged head 42. Head 42 seats against the lower face of the slide. At its lower or working end the head 42 of the holder is provided with a cylindrical recess 44, and at the center of the bottom of the recess there is fixed in the holder a pilot 46 which projects beyond the tool holder and is provided with a cylindrical pin-like end 48 which advantageously terminates in a hemispherical surface. An annular punch 50 surrounds the pilot 46 and is provided with a bore 52 at its lower end through which the pin portion of the pilot is adapted to pass. At the upper end of the punch 50 a cylindrical head 51 is provided, which fits the bore of the recess 44. The recess is closed by means of a cap or cover 54 screwed on the lower end of the head 42 and between this cover and the shoulder formed by the head 51 there is located a spring 56 which tends to keep the punch retracted as far as possible within the recess with the head 51 in contact with the bottom of the recess.

Figure 11:
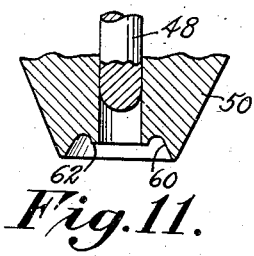
Fig. 11 is a section on enlarged scale of a part of the tool shown in Figs. 1 and 2.

The shank 40 of the holder 38 is provided with bores through which pins 58 pass. These pins are in alignment as shown in Fig. 5 with the knock-out bar, and are adapted to project into the recess 44 to force the head of the punch away from the bottom of the recess. The lower or working face of the punch is formed, as is more clearly shown in Fig. 11, to provide a generally conical recess 60, there being a downwardly projecting lip 62 at the perimeter of the bore in which the pilot pin 48 is situated.

Referring again to Fig. 1, the press bed 10 is advantageously recessed as at 63 to receive a resiliently mounted press bed member comprising a plate portion 64 and a stud 66 extending through the press bed to the lower side, where it is held by a nut 68. In the recess 63 below the plate member 64 there is a resilient bed 70, of rubber or the like, which is maintained under a predetermined compression pressure by means of adjustment of the nut 68.

For very heavy work, where high pressure under the plate 64 is desired, pneumatic means may advantageously be employed, and in Fig. 8 there is shown more or less diagrammatically an arrangement of this sort comprising a cylinder 71 formed below the press bed and having in it a piston 72 which is attached to the lower end of the stud portion 66 of the press bed member. Air or other compressible fluid medium is supplied to the chamber of the cylinder 71 at predetermined pressure through a supply pipe 74 in communication with any suitable source of fluid pressure.

The operation of the apparatus thus far described is as follows: by means of suitable feeding mechanism, which may be of any known form of construction and which, for the sake of clarity, has been omitted from the drawings, or by hand, a nut blank 76 of the form shown in Fig. 9 is fed to a position in the press in direct alignment with the pilot 46. As shown in Fig. 9, the nut blank comprises a threaded body portion having a recess 78 at the upper end of the bore, in which recess there is assembled a non-metallic washer 80. The washer 80 is somewhat thinner than the depth of the recess, so that the upper edge of the walls of the recess project above it as shown in the figure.

It will be understood that for the purpose of describing and claiming the present invention I use the term "washer" in a broad sense and intend to include within the meaning of this term any annular locking member which may be of integral or laminated form.

Assuming the press to be at the top of its stroke as shown in Fig. 2, the downward movement of the slide on its working stroke causes the knock-out bar to move into contact with the upper edge of slot 30. This permits spring 56 to push the head of the punch to the bottom of the recess in the tool holder so that the pilot pin 48 projects beyond the working face of the punch. Further, in this position the head of the punch is seated solidly against the bottom of the recess in the tool holder prior to contact of the punch with the nut blank. With the parts in this relative position, the pin 48 enters and passes through the bore of the washer 80. Thereafter, and with the pilot in the bore of the washer, the conical working face of the punch contacts the upper face of the nut blank and deforms the upper edge of the recessed walls of the blank by turning them inwardly and downwardly over the washer, the metal of the blank being deformed to the form shown in Fig. 10. The deformation of the metal of the blank is obviously effected by end pressure of the punch on the blank, and in order to secure the washer 80 in the blank with a predetermined locking pressure the resilient press bed member is provided.

It will be evident that in production manufacture, it is substantially impossible to hold the thickness of the nut blanks to exact limits, and it will further be evident that a variation of a few thousandths of an inch in the thickness of the blanks will, in a fixed stroke press, make a very substantial difference in the locking pressure applied to the washer upon deformation of the blank, if the blank is resting on a bed having a fixed distance with respect to the end point of the working stroke of the punch.

By substantial pre-compression of the resilient material under the movable press bed member or by use of compressed fluid of substantial pressure, sufficient resistance to movement of the press bed member may readily be obtained to enable the required amount of deforming pressure to be applied by the punch.

The deformation of the walls of the blank inwardly and downwardly will evidently tend to compress the washer radially toward its center as well as downwardly, and this inward deforming or crimping pressure serves to force the washer against the sides of the pilot member.

The usual material for the locking washer is compressed fiber of known kind, and I have discovered that the most satisfactory results are obtained by making the diameter of the pilot pin somewhat larger than the desired final diameter of the bore of the washer, since when the pilot is removed from the bore the compression force exerted on the washer causes the diameter to decrease. By using a pilot during the deforming operation, I find it possible to hold the final bore of the locking washer to very close limits for the desired value.

Figure 6:
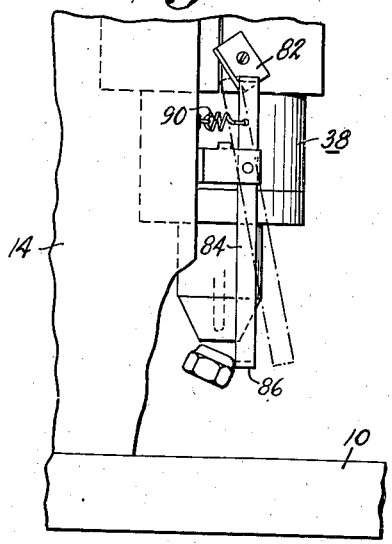
Fig. 6 is a side view of part of the apparatus.
Figure 7:
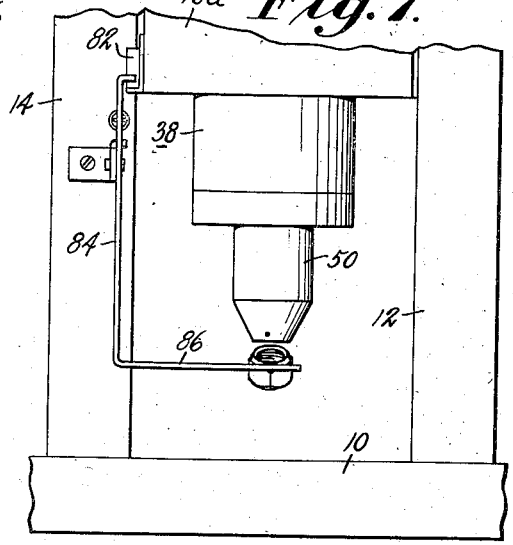
Fig. 7 is a front view of the apparatus shown in Fig. 6.

On the return stroke of the slide, the friction between the compressed washer and the pilot causes the nut to be lifted from the press bed with the pilot until the knock-out bar 32 comes in contact with the studs 36. Further movement of the slide on its return stroke then causes the knock-out bar to be moved from the position in the slot 30 shown in Fig. 1 to the position shown in Fig. 2, and this movement, through the pins 58, causes the punch to be moved relative to the holder and the pilot to a position as shown in Fig. 2, wherein the pilot is wholly retracted within the bore of the lower end of the punch. This action serves to strip the nut from the tool, which is then ready for a repetition of the operation on a succeeding nut blank which has been placed in proper position during the return stroke. In order to prevent the nut, when stripped from the tool, from falling into a position interfering with the next working stroke of the punch, means is provided for knocking the stripped nut laterally from the path of reciprocation of the slide. This means is shown in Figs. 6 and 7, and comprises a cam plate 82 secured to slide 16 and contacting a pivoted lever 84 mounted on the standard 14 and having an arm 86 arranged to knock the finished nut 88 laterally away from the tool as the latter reaches the position where the nut is stripped. On the working stroke, the arm 86 is kept out of the path of travel of the punch by means of spring 90.

It will be evident that tool apparatus of the above described character provides numerous advantages enabling finished nuts of uniform character to be produced rapidly from the blanks. The arrangement of tool holder and removable punch and pilot permits ready interchange of tool parts suitable for different sizes of nuts. The arrangement further permits free rotational movement of the punch in the holder, thus minimizing and equalizing wear. The spring which seats the punch firmly in the holder before the punch comes in contact with the blank, prevents destructive slamming of the punch against the holder, and the large area of the punch head also minimizes wear. For the best results, the punch should be of hardened material and the pilot of a relatively soft and ductile material.

It will be evident that many changes and variations in the specific form of the apparatus herein disclosed may be resorted to without departing from the invention, the scope of which is to be understood as embracing all that falls within the terms of the appended claims when they are construed as broadly as is consistent with the state of the prior art.

What I claim is:

1. In the manufacture of elastic stop nuts from blanks having an open-ended recess and a locking washer assembled therein, the improvement which consists in inserting a pilot member through the bore of the washer, deforming the walls of the recess inwardly over the top of the washer to lock the washer in said recess while said pilot member is in said bore and serving to limit the radially inward movement of the walls of the bore due to such deforming, and thereafter withdrawing said pilot member from said bore.

2. In the manufacture of elastic stop nuts from blanks having an open-ended recess and a non-metallic washer assembled therein, the improvement which consists in maintaining the diameter of the bore of the washer larger than the desired final diameter by inserting through the bore of the washer a pilot member having a diameter larger than said final diameter, deforming the walls of the recess inwardly over the top of the washer to lock the washer in said recess while said pilot member is inserted through said bore and thereafter withdrawing said pilot member.

3. The method of forming an elastic stop nut from a stop nut blank having a recessed bore and a locking washer in said bore which consists in enlarging the initial diameter of the bore of the washer to a size greater than the desired final diameter and locking the washer in the recess by deforming the walls of the recess inwardly over the top of the washer due to end pressure applied to the blank while maintaining said enlarged diameter of the bore of the washer.

4. The method of forming an elastic stop nut from a stop nut blank having a recessed bore and a non-metallic locking washer in said bore which consists in enlarging the initial diameter of the bore of the washer to a size larger than the desired final diameter, locking the washer in the recess by deforming the walls of the recess inwardly over the top of the washer due to end pressure applied to the blank while maintaining said enlarged diameter of the bore of the washer and resiliently supporting said blank while applying said end pressure whereby to secure said locking washer in the blank with predetermined pressure.

5. In apparatus for the manufacture of elastic stop nuts of the kind having a non-metallic locking washer incorporated therein, a pilot for determining the final diameter of the bore of the washer and a punch movable with respect to said pilot for deforming the side walls of the nut blank around the washer to lock it in the nut while said pilot is in said bore.

6. In apparatus for the manufacture of elastic stop nuts of the kind having a non-metallic locking washer incorporated therein, a pilot having a diameter greater than the initial diameter of the bore of the washer, means for forcing said pilot through the washer and a punch movable with respect to said pilot for deforming the side walls of the nut blank around the washer to lock it in the nut while said pilot is in said bore.

7. In apparatus for the manufacture of elastic stop nuts of the kind having a non-metallic locking washer incorporated therein, a tool comprising a holder adapted to be mounted in the slide of a press, a pilot fixed in said holder for determining the final diameter of the bore of said washer, and a punch reciprocably mounted in said holder for turning the side walls of a nut blank inwardly and downwardly over said washer while said pilot is in the bore of the washer.

8. In apparatus for the manufacture of elastic stop nuts of the kind having a non-metallic locking washer incorporated therein, a tool comprising a holder adapted to be mounted in the slide of a press, a recess in said holder, a pilot fixed in the holder and extending therefrom for determining the final diameter of the bore of said washer, an annular punch for deforming the walls of the nut to lock the washer in place, said punch surrounding said pilot and having a head reciprocably mounted in said recess and a spring for resiliently holding said head in contact with the bottom of said recess.

9. In apparatus for the manufacture of elastic stop nuts of the kind having a non-metallic washer incorporated therein, a tool comprising a holder adapted to be mounted in the slide of a press, a pilot fixed in said holder for determining the final inside diameter of the bore of said washer, a recess in said holder, an annular punch for deforming the walls of the nut to lock the washer in place, said punch surrounding said pilot and having a head reciprocably mounted in said holder and a spring in said recess for holding said head in contact with the bottom of the recess, said pilot extending beyond the end of the bore of the working end of said punch when said head is seated in said recess.

10. In apparatus for the manufacture of elastic stop nuts of the kind having a non-metallic washer incorporated therein, a tool comprising a holder adapted to be mounted in the slide of a press, a recess in said holder, a pilot fixed in the holder and extending therefrom for determining the final diameter of the bore of said washer, an annular punch for deforming the walls of the nut to lock the washer in place, said punch surrounding said pilot and having a head reciprocably mounted in said holder, a spring in said recess for holding said head in contact with the bottom of the recess, said pilot extending beyond the end of the bore of the working end of said punch when said head is seated in said recess, and means for forcing said punch away from its seat in said holder to a position with said pilot retracted within the bore of the operating end of the punch.

11. In apparatus for the manufacture of elastic stop nuts of the kind having a non-metallic washer incorporated therein, a tool comprising a holder having a cylindrical recess, a pilot fixed in the holder and extending therefrom coaxially of the recess, an annular punch slidably mounted around said pilot and having a head reciprocable in said recess, an annular cover for closing said recess, a spring located in said recess between said cover and said head and acting to seat said head in the bottom of the recess, and a plurality of pins extending through the body of said holder and contacting said head for moving said punch outwardly of the holder.

12. A tool for securing locking washers in elastic stop nuts comprising a holder adapted to be secured in the slide of a punch press, a pilot fixed in said holder and adapted to pass through the bore of the washer on the working stroke of the press, a punch reciprocably mounted in said holder and having a working face for deforming the side walls of the nut inwardly and downwardly around said washer on the working stroke of the press after the pilot has passed through the bore of the washer, whereby to compress the washer inwardly against the pilot and to cause the nut to be carried with the pilot on the return stroke of the press, and means for moving said punch relative to said pilot on the return stroke of the press to strip the nut from the pilot.

13. Apparatus for securing locking washers in elastic stop nuts comprising a holder adapted to be secured in the slide of a punch press, a pilot fixed in said holder and adapted to pass through the bore of the washer on the working stroke of the press, a punch reciprocably mounted in said holder and having a working face for deforming the side walls of the nut inwardly and downwardly around said washer on the working stroke of the press after the pilot has passed through the bore of the washer, whereby to compress the washer inwardly against the pilot and to cause the nut to be carried with the pilot on the return stroke of the press, means for moving said punch relative to said pilot on the return stroke of the press to strip the nut from the pilot, and means operable after the operation of the last mentioned means for knocking the stripped nut laterally from the path of reciprocation of said pilot and punch.

14. In apparatus for forming elastic stop nuts from nut blanks having a non-metallic washer assembled in an open-ended recess in the end of the bore of the blank, a press-bed for the blank, a slide reciprocable with respect to said bed, a pilot movable with said slide and arranged to pass through the bore of said washer on the working stroke of the slide, a punch movable with said slide on the working stroke of the slide, said punch having a working face for deforming the side walls of the open end of said recess inwardly and downwardly over said washer after said pilot is in the bore of the washer, said punch being reciprocably mounted relative to said slide, and means associated with said slide for moving said punch with respect to said slide and with respect to said pilot on the return stroke of the slide whereby to strip the nut from the pilot.

15. In apparatus for forming an elastic stop nut from a stop nut blank having a non-metallic washer assembled in an open-ended recess at one end of the bore of the blank, a press-bed for the blank, a reciprocable slide having a fixed stroke relative to said bed, a pilot fixed with respect to said slide, and an annular punch surrounding said pilot and having a working position with said pilot projecting beyond the end of the punch, said pilot entering the bore of said washer on the working stroke of said slide before contact of the working face of said punch with the blank, and the working face of said punch being formed to turn the side walls of the open end of said recess inwardly and downwardly over said washer at the end of the working stroke of the slide.

16. In apparatus for forming an elastic stop nut from a nut blank having a non-metallic washer assembled in an open-ended recess at one end of the bore of the blank, a resilient press-bed for supporting the blank, a reciprocable slide having a fixed pilot arranged to pass through the bore of the washer on the working stroke of the slide and an annular punch surrounding said pilot and having a working face for deforming the walls of said recess inwardly and downwardly over said washer due to end pressure on the blank against said resilient press-bed whereby to secure said washer in said blank with predetermined pressure.

CARL A. SWANSTROM.